US012679238B2

(12) United States Patent
Löffler

(10) Patent No.: US 12,679,238 B2
(45) Date of Patent: Jul. 14, 2026

(54) SYSTEM AND METHOD FOR PRECONDITIONING OF A CHARGING POINT

(71) Applicant: AUDI AG, Ingolstadt (DE)

(72) Inventor: Jürgen Löffler, Munich (DE)

(73) Assignee: Audi AG, Ingolstadt (DE)

( * ) Notice: Subject to any disclaimer, the term of this patent is extended or adjusted under 35 U.S.C. 154(b) by 699 days.

(21) Appl. No.: 18/153,845

(22) Filed: Jan. 12, 2023

(65) Prior Publication Data

US 2023/0219441 A1      Jul. 13, 2023

(30) Foreign Application Priority Data

Jan. 13, 2022    (DE) .......................... 102022100682.4

(51) Int. Cl.
| | |
|---|---|
| *B60L 53/60* | (2019.01) |
| *B60L 53/16* | (2019.01) |
| *G06Q 10/02* | (2012.01) |
| *H02J 7/70* | (2026.01) |
| *H02J 7/80* | (2026.01) |

(52) U.S. Cl.
CPC ............... *B60L 53/60* (2019.02); *B60L 53/16* (2019.02); *G06Q 10/02* (2013.01); *H02J 7/70* (2026.01); *H02J 7/80* (2026.01)

(58) Field of Classification Search
CPC ........ B60L 53/60; B60L 53/16; H02J 7/0042; H02J 7/0047

USPC .......................................................... 320/109
See application file for complete search history.

(56) References Cited

U.S. PATENT DOCUMENTS

| | | | | |
|---|---|---|---|---|
| 9,260,025 B1* | 2/2016 | McGrath | ............... | F24H 9/0063 |
| 2012/0245750 A1 | 9/2012 | Paul et al. | | |
| 2015/0041273 A1* | 2/2015 | Klein | ....................... | B60M 1/34 |
| | | | | 191/48 |
| 2019/0217713 A1* | 7/2019 | Salter | ...................... | B60L 53/16 |
| 2020/0001721 A1* | 1/2020 | Merryweather | ......... | B60J 10/86 |
| 2020/0091744 A1* | 3/2020 | Väin | ......................... | B60L 53/65 |
| 2021/0053451 A1* | 2/2021 | Bailey | ..................... | B60L 53/16 |
| 2023/0004901 A1* | 1/2023 | Shaotran | ................. | B60L 50/60 |

FOREIGN PATENT DOCUMENTS

| | | |
|---|---|---|
| CN | 108146280 A | 6/2018 |
| CN | 110040005 A | 7/2019 |
| CN | 110040026 A | 7/2019 |
| CN | 212046925 U | 12/2020 |
| DE | 102011076183 A1 | 11/2012 |
| DE | 102011119495 A1 | 5/2013 |
| DE | 102016122009 A1 | 5/2018 |
| DE | 102017118327 A1 | 2/2019 |
| DE | 102018100731 A1 | 7/2019 |
| DE | 102018100732 A1 | 7/2019 |
| DE | 102018106132 A1 | 9/2019 |
| DE | 102020125512 A1 | 3/2022 |

* cited by examiner

*Primary Examiner* — Nathaniel R Pelton
(74) *Attorney, Agent, or Firm* — Seed Intellectual Property Law Group LLP

(57)          ABSTRACT

The present disclosure relates to a system and a method for preconditioning of heatable charging points of a charging station as needed.

10 Claims, 2 Drawing Sheets

SYSTEM AND METHOD FOR PRECONDITIONING OF A CHARGING POINT

BACKGROUND

Technical Field

Embodiments of the invention relate to a system and a method for preconditioning of heatable charging points of a charging station as needed.

Description of the Related Art

In the winter the charging plugs of public charging points may become frosted. This makes it uncomfortable for the user to handle the charging plugs. Furthermore, the frosting may cause problems when inserting the charging plug into the charging socket on the vehicle and melt water can get into the charging interface and result in short circuits.

In DE 10 2011 119 495 A1 there is described a heatable charging cable for a motor vehicle. It states there that the heating of the cable can be controlled by a switch at the charging point. After arriving at the charging point, the user must first activate the switch in order to heat the cable and remove the frosting.

CN 2 12 046 925 U discloses a heating system for a charging cable. The heating system comprises a temperature sensor, a heating device, and a control unit. The temperature sensor and the heating device are electrically connected to the regulator. The temperature sensor and the heating device are mounted on the outer surface of the charging cable. During cold weather, the temperature sensor measures the surface temperature of the charging cable and the controller adjusts the temperature of the charging cable by controlling the heating device so that the surface temperature of the charging cable is always in a normal temperature condition.

US 2012/245 750 A1 concerns a system for planning of charging processes for electric vehicles. A charging prediction database stores information on electric vehicles which will presumably arrive for charging. A profile/charging information database stores information on electric vehicles which have arrived and are waiting to be charged. An energy database stores information about an energy source, comprising a power grid or a stationary battery. An energy calculation unit calculates the energy available from the energy source based on the energy database. A planning unit plans the charging of the electric vehicles waiting to be charged, taking into account the anticipated arrival of the electric vehicles.

BRIEF DESCRIPTION OF THE SEVERAL VIEWS OF THE DRAWINGS

FIG. 1 shows a system 100 according to an embodiment of the present disclosure. The system 100 includes a heatable charging point 102 and a device 104 that, in operation, controls the heatable charging point 102 and communicates with an electric vehicle that is to be charged at the heatable charging point 102. The heatable charging point 102 may include a heatable charging cable 106, a heatable charging plug 108, a mobile radio interface 110, a camera 112, an ambient temperature sensor 114, a humidity sensor 116, a ground temperature sensor 118, and/or a heating device 120 that, in operation, heats ground around the heatable charging point 102.

FIG. 2 shows a method 200 according to an embodiment of the present disclosure. The method 200 includes receiving an order to reserve and precondition a heatable charging point at 202, allocating the heatable charging point to an electric vehicle at 204, starting heating of the heatable charging point at 206, and using information about ambient parameters of the heatable charging point during heating at 208. The method 200 may include recognizing frosting of the heatable charging point at 210, heating and defrosting a charging plug of heatable charging point at 212, heating and defrosting a charging cable of heatable charging point at 214, and heating and defrosting ground around the heatable charging point at 216.

BRIEF SUMMARY

Figure 1:
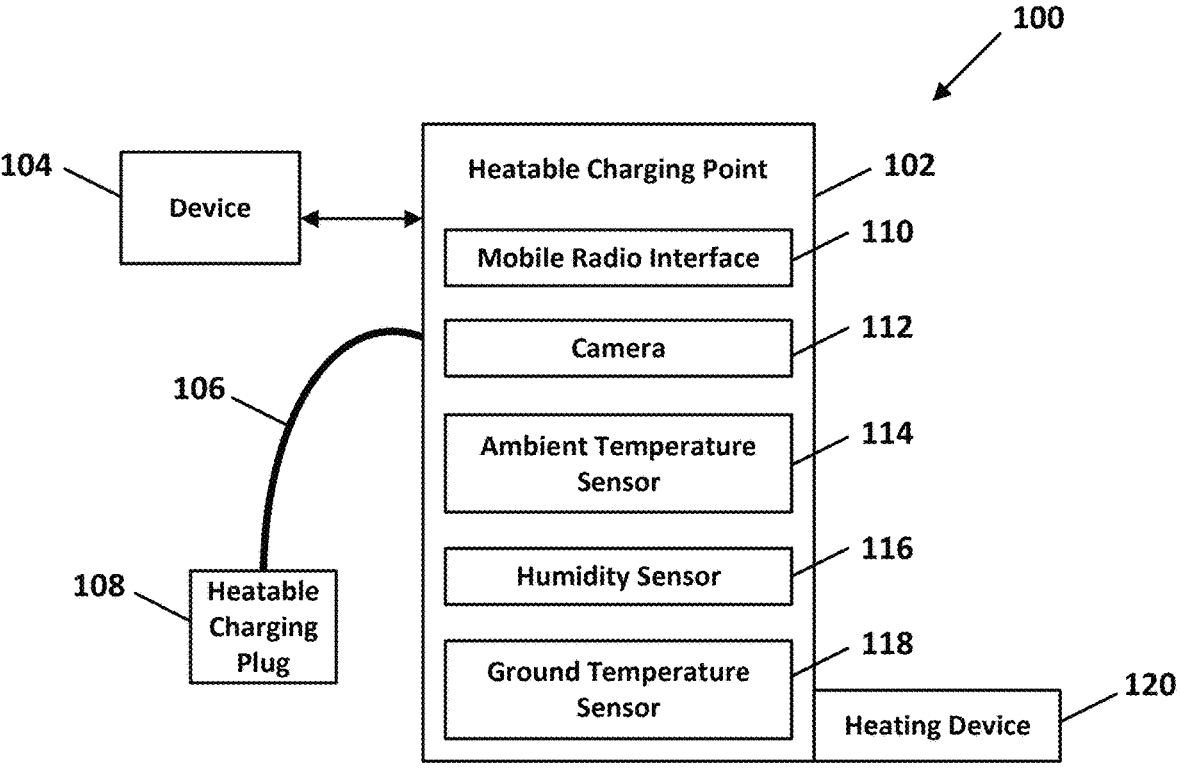
FIG. 1 shows a system according to an embodiment of the present disclosure.
Figure 2:
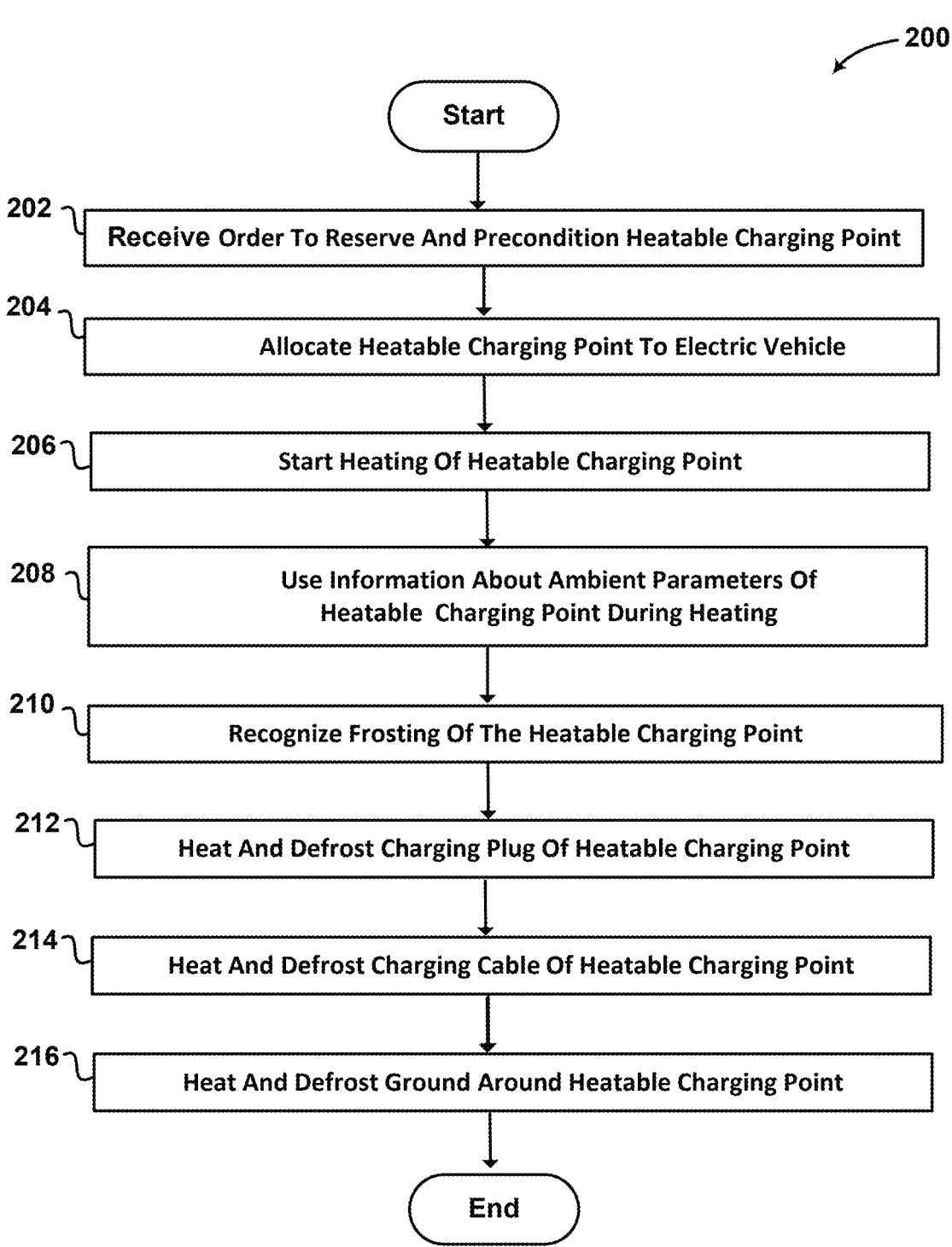
FIG. 2 shows a method according to an embodiment of the present disclosure.

Some embodiments provide a device and a method for removing the frosting at charging points in good time prior to the arrival of a user at the charging point, while the charging point is not heated constantly, in order to save on energy.

DETAILED DESCRIPTION

Some embodiments provide a system for preconditioning of at least one heatable charging point as needed, comprising at least one heatable charging point and a device for control of the at least one heatable charging point, which is adapted for communication with at least one electric vehicle which is going to be charged at the at least one charging point. In one embodiment, the device for control of the at least one heatable charging point comprises a mobile radio interface. In one embodiment, the device for control of the at least one heatable charging point is connected to a backend which is adapted to receive and process data about an electric vehicle which is going to be charged at the at least one charging point. In one embodiment, the backend is adapted to receive data about an electric vehicle which is going to be charged at the at least one charging point from a second backend.

In one embodiment, the at least one heatable charging point comprises at least one heatable charging plug. In another embodiment, the at least one heatable charging point comprises at least one heatable charging cable. In another embodiment, the at least one heatable charging point comprises at least one device for heating the ground around the charging point.

In one embodiment, the system comprises at least one sensor for detecting the ambient temperature of the at least one charging point. In another embodiment, the system comprises at least one sensor for detecting the humidity in the surroundings of the at least one charging point. In another embodiment, the system comprises at least one sensor for detecting the ground temperature in the vicinity of the at least one charging point. In another embodiment, the system comprises at least one camera, which is aimed at the at least one charging point. In another embodiment, the at least one camera registers the charging plug of the at least one charging point and/or the charging cable of the at least one charging point and/or the ground around the at least one charging point.

In one embodiment, the device for control of the at least one charging point is adapted to receive and process weather data. In another embodiment, the device for control of the at least one charging point is adapted to recognize a frosting of the charging plug by image processing of camera images of the charging plug of the at least one charging point.

Some embodiments include a method for preconditioning of a heatable charging point as needed for a system as described herein. When a user arrives at the charging station, the charging point should already be preconditioned, i.e., frosting of the charging station should have been removed. For this, the charging plug or its handle need to be heated. Optionally, furthermore, the charging cable and possibly the ground in front of the charging point should be heated. The heating should not be constant, in order to save on energy. For this, the user, who is generally the driver of an electric vehicle, has the ability to reserve a charging point prior to arrival at the charging station and to arrange for a heating.

In the method for preconditioning of a heatable charging point as needed for a system as described herein, a user of the system prior to arrival of the electric vehicle of the user at a charging station of the system sends an order to reserve a heatable charging point and for preconditioning of the heatable charging point to the system and relays data on a presumable arrival time of the electric vehicle of the user at the charging station. The system allocates to the electric vehicle of the user a charging point and the device for control of the heatable charging point of the system starts heating of the charging point prior to the arrival of the electric vehicle of the user, so that the heatable charging point is defrosted upon arrival of the electric vehicle of the user. The device for control of the heatable charging point makes use of information about the ambient parameters of the charging point during the control of the heating.

In the proposed method, a user of the system described herein, prior to arrival at a charging station, sends an order to reserve a charging point and for preconditioning of the charging point to the system described herein. Data is also relayed as to the presumable arrival time of the electric vehicle of the user at the charging station.

In one embodiment of the method, a communication of the electric vehicle takes place for this purpose via a mobile radio interface with a backend of the vehicle manufacturer. The backend of the vehicle manufacturer relays information to a backend of the system described herein, containing among other things the expected arrival time. In one embodiment, the expected arrival time is the expected arrival time as computed by a navigation system of the electric vehicle. The backend of the system relays this information to the device for control of the at least one heatable charging point of the system described herein.

In another embodiment of the method, the communication of the electric vehicle occurs via a mobile radio interface with a mobile radio interface of the device for control of the at least one heatable charging point of the system described herein.

The system described herein allocates a charging point to the electric vehicle of the user and begins the heating of the charging plug prior to arrival of the electric vehicle of the user, so that the defrosting is completed upon arrival of the electric vehicle of the user.

For the control of the heating process, the control unit of the charging station makes use of information about ambient parameters (such as air temperature, humidity, and ground temperature). In one embodiment of the method, the ambient parameters are detected by sensors of the system described herein. In another embodiment, the system described herein makes use of weather data to determine the ambient parameters. In another embodiment, the system described herein recognizes a frosting of the charging point by image processing of camera images of the charging point.

In one embodiment of the method, only the charging plug of the allocated charging point is heated and defrosted (Basic version). In another embodiment of the method, the charging cable of the allocated charging point is also heated and defrosted (Comfort version). In another embodiment of the method, the charging plug of the allocated charging point is heated until the charging plug is warm to the touch (i.e., it has a temperature in the range of 25° C. to 35° C.). In another embodiment of the method, the ground around the allocated charging point is also heated and defrosted (Premium version). In another embodiment of the method, the ground around the allocated charging point is heated until it is dry.

Among the benefits of the method described herein are that it improves the operating comfort for a user of a charging station in the winter and the danger of faulty operation or accidents due to frost is reduced. The system and method described herein are furthermore energy efficient, since a heating is done only when needed and is limited in time. Further benefits and embodiments will emerge from the description.

Of course, the above mentioned features and those yet to be explained below can be used not only in the particular indicated combination, but also in other combinations or standing alone. Put another way, aspects of the various embodiments described herein can be combined to provide further embodiments.

German patent application no. 10 2022 100682.4, filed Jan. 13, 2022, to which this application claims priority, is hereby incorporated herein by reference in its entirety.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system comprising:
a heatable charging point; and
a device that, in operation, controls the heatable charging point and communicates with an electric vehicle that is to be charged at the heatable charging point,
wherein, the device, in operation:
receives, prior to arrival of the electric vehicle at the heatable charging point, an order to reserve the heatable charging point and to precondition the heatable charging point, wherein data on a presumable arrival time of the electric vehicle at the heatable charging point is relayed to the device, and wherein the electric vehicle is allocated to the heatable charging point;
starts heating of the heatable charging point prior to arrival of the electric vehicle at the heatable charging point, wherein the heatable charging point is defrosted upon arrival of the electric vehicle at the heatable charging point; and
uses information about ambient parameters of the heatable charging point during the heating.

2. The system according to claim 1, wherein the device includes a mobile radio interface.

3. The system according to claim 1, wherein the heatable charging point includes a heatable charging plug.

4. The system according to claim 1, wherein the heatable charging point includes a heatable charging cable.

5. The system according to claim 1, wherein the heatable charging point includes a heating device that, in operation, heats ground around the heatable charging point.

6. The system according to claim 1, comprising a sensor that, in operation, detects an ambient temperature of the heatable charging point and/or a sensor that, in operation, detects a humidity in surroundings of the heatable charging point and/or a sensor that, in operation, detects a ground temperature in a vicinity of the heatable charging point.

7. The system according to claim 1, comprising a camera that, in operation, is aimed at the heatable charging point and registers a charging plug of the heatable charging point and/or a charging cable of the heatable charging point and/or ground around the heatable charging point.

8. A method for preconditioning a heatable charging point of a system including the heatable charging point and a device that controls the heatable charging point and communicates with an electric vehicle configured to be charged at the heatable charging point, the method comprising:

receiving by, the system, prior to arrival of the electric vehicle at the heatable charging point, an order to reserve the heatable charging point and to precondition the heatable charging point, wherein data on a presumable arrival time of the electric vehicle at the heatable charging point is relayed to the device;

allocating to the electric vehicle, by the system, the heatable charging point;

starting heating of the heatable charging point, by the device, prior to arrival of the electric vehicle at the heatable charging point, wherein the heatable charging point is defrosted upon arrival of the electric vehicle at the heatable charging point, wherein the device, uses information about ambient parameters of the heatable charging point during the heating.

9. The method according to claim 8, in which the system recognizes a frosting of the heatable charging point by image processing of camera images of the heatable charging point.

10. The method according to claim 8, in which a charging plug of the heatable charging point is heated and defrosted and/or a charging cable of the heatable charging point is heated and defrosted and/or ground around the heatable charging point is heated and defrosted.

\* \* \* \* \*